(No Model.)
P. MARX.
FLOUR SIFTER.
No. 344,972. Patented July 6, 1886.
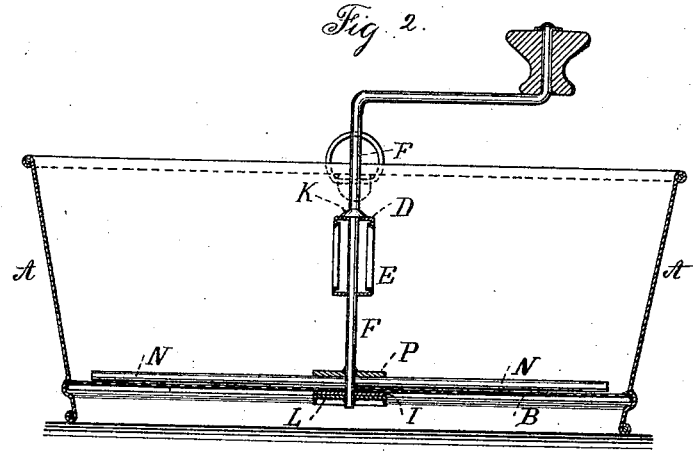
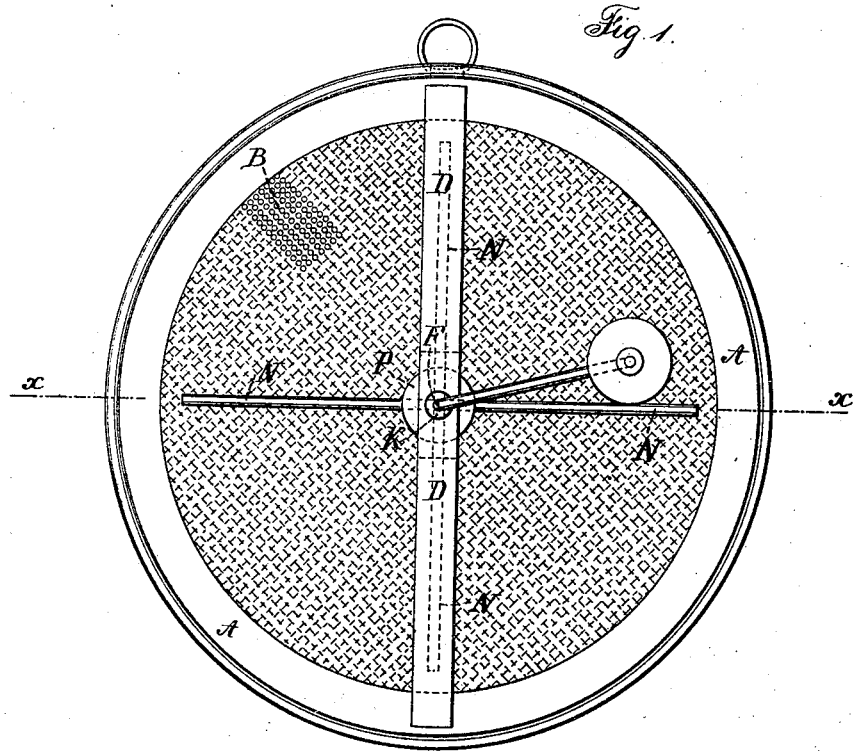
Witnesses:
J. Staib
Chas. H. Smith
Inventor
Philipp Marx
per Lemuel W. Serrell
Atty.

UNITED STATES PATENT OFFICE.

PHILIPP MARX, OF NEW YORK, N. Y., ASSIGNOR TO LEO SCHLESINGER & CO., OF SAME PLACE.

FLOUR-SIFTER.

SPECIFICATION forming part of Letters Patent No. 344,972, dated July 6, 1886.

Application filed April 8, 1886. Serial No. 198,197. (No model.)

*To all whom it may concern:*

Be it known that I, PHILIPP MARX, of the city and State of New York, have invented an Improvement in Flour-Sifters, of which the following is a specification.

The object of this invention is to sift flour, meal, or similar material, and to prevent injury to the sieve, and to render the parts rapid in operation and durable in use.

Flour-sifters as heretofore constructed are liable to be rapidly worn by the action of the stirrers as they are revolved in contact with the wire sieve. By my improvement the sieve-bottom is supported in the middle by the shaft that carries the stirrers, and the parts mutually strengthen each other, so that the flour-sifter is rendered more durable, and at the same time is easily cleaned.

In the drawings, Figure 1 is a plan view of my improved sifter, and Fig. 2 is a vertical section at the line x x.

My improved sifter is in the form of a pan having a rim, A, with a bottom, B, of perforated sheet metal, soldered around its edges to the rim of the pan at a sufficient distance above the bottom edge of the rim for said rim to leave a supporting-flange for the sifter, and the said rim of the pan is wired at the top edge, and preferably at the bottom, also, to strengthen the rim. There is a cross-bar, D, firmly secured at its ends by solder to the inside of the pan, and beneath this cross-bar is a bridge-piece, E, arched downwardly, and attached at its end by solder or rivets to the cross-bar D. The cross-bar and bridge-piece are perforated for the reception of the vertical shaft F, having a crank at its upper end and handle, by which it can be freely revolved, and this shaft passes also through the center of the sieve B, at which place a re-enforcing disk, I, is soldered to the screen. Above the cross-bar D a collar, K, is soldered to the shaft, and beneath the disk I is a second collar, L, soldered upon the end of the shaft, so that the screen is supported in its middle part by the collar L, to prevent the said sifter bulging downwardly by the weight of flour or meal that is being operated upon. The stirrers N occupy radial positions to the shaft, and they are attached at their inner ends to the disk P, through which the shaft F passes, the parts being firmly soldered together. When the crank handle and shaft are revolved, the stirrers pass around above the sieve and within the flour, so as to agitate the latter and cause the same to pass down through the sieve; and any lumps are either broken up or retained within the sieve, along with any foreign substances in the flour.

I claim as my invention—

A flour-sifter comprising a sheet-metal rim, a sieve of perforated sheet metal forming the bottom and secured at its edges to the rim, a cross-bar and bridge, a vertical shaft having a crank-handle and passing through the cross-bar, bridge, and sieve-bottom, a re-enforcing disk surrounding the shaft and attached to the sieve-bottom, collars soldered to the shaft above the cross-bar and below the re-enforcing disk, radial stirrers, and a disk through which the shaft passes and to which the stirrers and shaft are attached, substantially as set forth.

Signed by me this 2d day of April, A. D. 1886.

PH. MARX.

Witnesses:
SIDNEY H. CARR,
PHIL. BEAR.